United States Patent
Chan et al.

(10) Patent No.: US 8,368,834 B2
(45) Date of Patent: Feb. 5, 2013

(54) DISPLAY DEVICE WITH COMPOSITE BACKLIGHT MODULE

(75) Inventors: Wei-Jung Chan, Taoyuan County (TW); Chia-Feng Teng, Taipei (TW)

(73) Assignee: Hannstar Display Corp., Taipei (TW)

( * ) Notice: Subject to any disclaimer, the term of this patent is extended or adjusted under 35 U.S.C. 154(b) by 573 days.

(21) Appl. No.: 12/490,150

(22) Filed: Jun. 23, 2009

(65) Prior Publication Data

US 2010/0165230 A1  Jul. 1, 2010

(30) Foreign Application Priority Data

Dec. 26, 2008  (TW) ................... 97150986 A

(51) Int. Cl.
*G02F 1/1333* (2006.01)
*G02F 1/335* (2006.01)
*F21V 7/04* (2006.01)

(52) U.S. Cl. ............ 349/58; 349/61; 362/632; 362/633; 362/634

(58) Field of Classification Search ............... 349/58, 349/61; 362/97.2–97.3, 632–634
See application file for complete search history.

(56) References Cited

U.S. PATENT DOCUMENTS

| | | | |
|---|---|---|---|
| 5,804,780 A * | 9/1998 | Bartha ............... | 200/5 A |
| 6,222,597 B1 * | 4/2001 | Muramatsu ........ | 349/58 |
| 6,498,631 B2 * | 12/2002 | Natsuyama ....... | 349/62 |
| 2006/0215072 A1 * | 9/2006 | Hashino et al. ... | 349/58 |

* cited by examiner

*Primary Examiner* — Nathanael R Briggs
(74) *Attorney, Agent, or Firm* — WPAT, P.C.; Anthony King

(57) ABSTRACT

The present invention discloses a display device comprising a bezel, a cell, at least one film, a light bar and a composite backlight module. The composite backlight module comprises a plurality of connecting structures coupled with the bezel for fixing and protecting the cell, a containing space for containing the cell and the film, and a light guide portion for guiding light emitted by the light bar to a light exit surface of the composite backlight module. The composite backlight module is made of a same material by injection molding.

8 Claims, 4 Drawing Sheets

DISPLAY DEVICE WITH COMPOSITE BACKLIGHT MODULE

BACKGROUND OF THE INVENTION

1. Field of the Invention

The present invention generally relates to a display device, and more particularly to a display device with composite backlight module.

2. Description of the Related Art

As electronic technologies advances and portable electronic products become popular in our daily life, the demand for light, thin, short and compact display devices of low power consumption increases with time. Since liquid crystal display (LCD) has advantages of low power consumption, small amount of generated heat, and lightweight feature, LCDs are commonly used in electronic products and gradually replace traditional cathode ray tube (CRT) display devices. Since liquid crystal cells are not self-emitting devices, therefore it is necessary to have a backlight module to uniformize the light for providing a uniformly distributed light source. However, the cost of the backlight module occupies a relatively large percentage of the total cost of the LCD modules and the percentage of the total cost becomes increasingly higher as the dimension increases. In addition, the components of the backlight module are very complicated, and the cost of each component becomes a burden, and the complicated components also increase the level of complexity for assembling the backlight modules. Therefore, it is an important subject for LCD panel manufacturers to reduce the quantity of components and integrate the components to simplify the backlight module assembling procedure, in addition to an effective cost reduction of related components or materials.

With reference to FIG. 1 for an exploded view of a first component of a conventional backlight module, the LCD module comprises a bezel 11, a cell 12, a film 13, a frame 14, a light guide plate (LGP) 15, a light bar 16, a reflector 17 and a backcover 18 assembled in a sequential order. In the assembling procedure, the conventional backlight module includes a backcover 18, a frame 14 and a light guide plate 15, and combines the backcover 18, the frame 14 and the bezel 11 in order to fix other components and materials into the backlight module effectively, so that the LCD modules gone through such assembling procedure have the advantages of a stable and secured structure and a high optical quality, but these LCD modules also involve a large quantity of components and a complicated assembling procedure. As a result, the manufacturing procedure in the production line is extended to increase the level of difficulty and the consumption of materials of the backlight modules, and thus increasing the material cost.

In view of the aforementioned shortcomings of the prior art, the present invention provides a display device with composite backlight module to overcome these shortcomings.

SUMMARY OF THE INVENTION

Therefore, it is a primary objective of the present invention to provide a display device with composite backlight module to reduce the number of components, simplify the manufacturing procedure, and lower the material cost effectively.

To achieve the foregoing objective, the present invention provides a liquid display device with composite backlight module, comprising: a bezel, a cell, at least one film, a light bar and a composite backlight module. The bezel includes a plurality of first connecting structures, and the light bar provides a light source to the cell, and the light bar includes at least one light emitting diode and a printed circuit board or a cold cathode fluorescent lamp (CCFL). The composite backlight module includes a plurality of second connecting structures and a containing space, and the second connecting structures are installed on an outer lateral side of the composite backlight module for engageing with the first connecting structures on a lateral side of the bezel. The containing space includes a first recessed portion, a second recessed portion and a third recessed portion. The dimension of the first recessed portion is corresponding to the dimension of the film for accommodating the film, and the dimension of the second recessed portion is corresponding to the dimension of the cell for accommodating the cell. The third recessed portion is disposed under the second recessed portion and in a slender shape for placing the light bar. In addition, the open region area of the second recessed portion is greater than an open region area of the first recessed portion; the open region area of first recessed portion is greater than an open region area of the third recessed portion. The composite backlight module includes a light guide portion for guiding light emitted by the light bar toward a light exit surface of the composite backlight module, and the light exit surface is arranged corresponding to the display surface of the cell, and the film uniformizes a light and supplies a uniformly distributed light source to the cell. The reflector is disposed at the bottom and the periphery of the composite backlight module for reflecting light emitted toward the bottom of the composite backlight module to enhance the utility rate of the light.

The present invention further provides a display device with composite backlight module, characterized in that a conventional light guide plate (LGP), backcover and a frame are integrated to form the composite backlight module, and the advantage of injection molding (capable of molding modules in various different shapes) effectively integrates the light guide plate (LGP), the backcover and the frame as a whole, and all of the aforementioned three components are integrated by the injection molding process. The composite backlight module still maintains the original mechanical characteristics of each component and effectively simplifies three components into a component module. Therefore, the composite backlight module simply requires the injection molding process once, and the present invention uses the same material to produce the composite backlight module, and thus the invention not only reduces the components and materials, but also simplifies the manufacturing procedure and lowers the cost effectively.

To make it easier for examiner to understand the technical characteristics and the effects of the present invention, we use preferred embodiments accompanied with related drawings for the detailed description of the present invention as follows.

DETAILED DESCRIPTION OF THE PREFERRED EMBODIMENTS

The present invention will become apparent from the description of a preferred embodiment of a display device with composite backlight module and the illustration of the related drawings, and it is noteworthy to point out that same elements mentioned in the preferred embodiment are numbered with the same numerals respectively.

Figure 1:
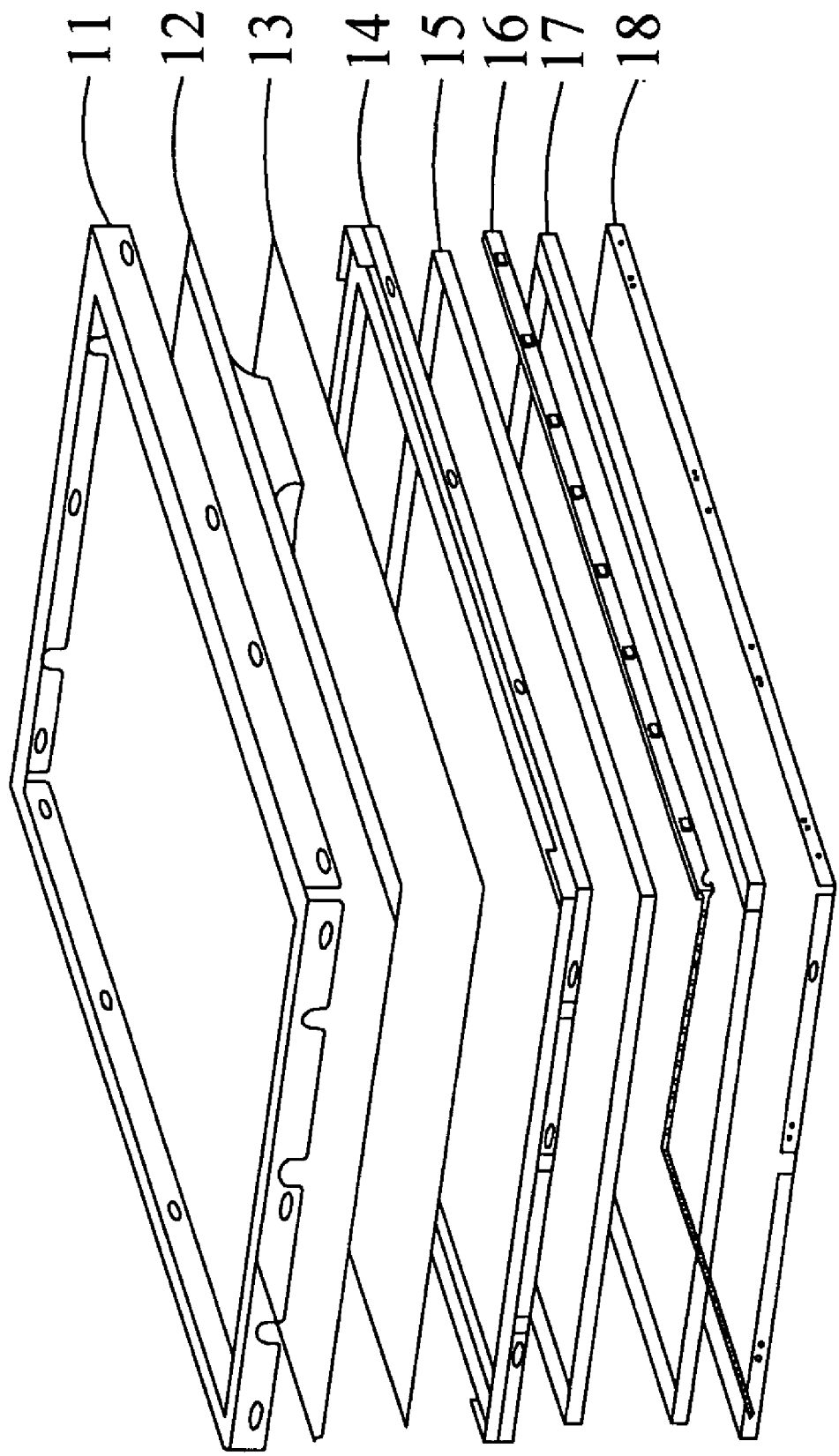
FIG. 1 is an exploded view of a first component of a conventional backlight module.
Figure 2A:
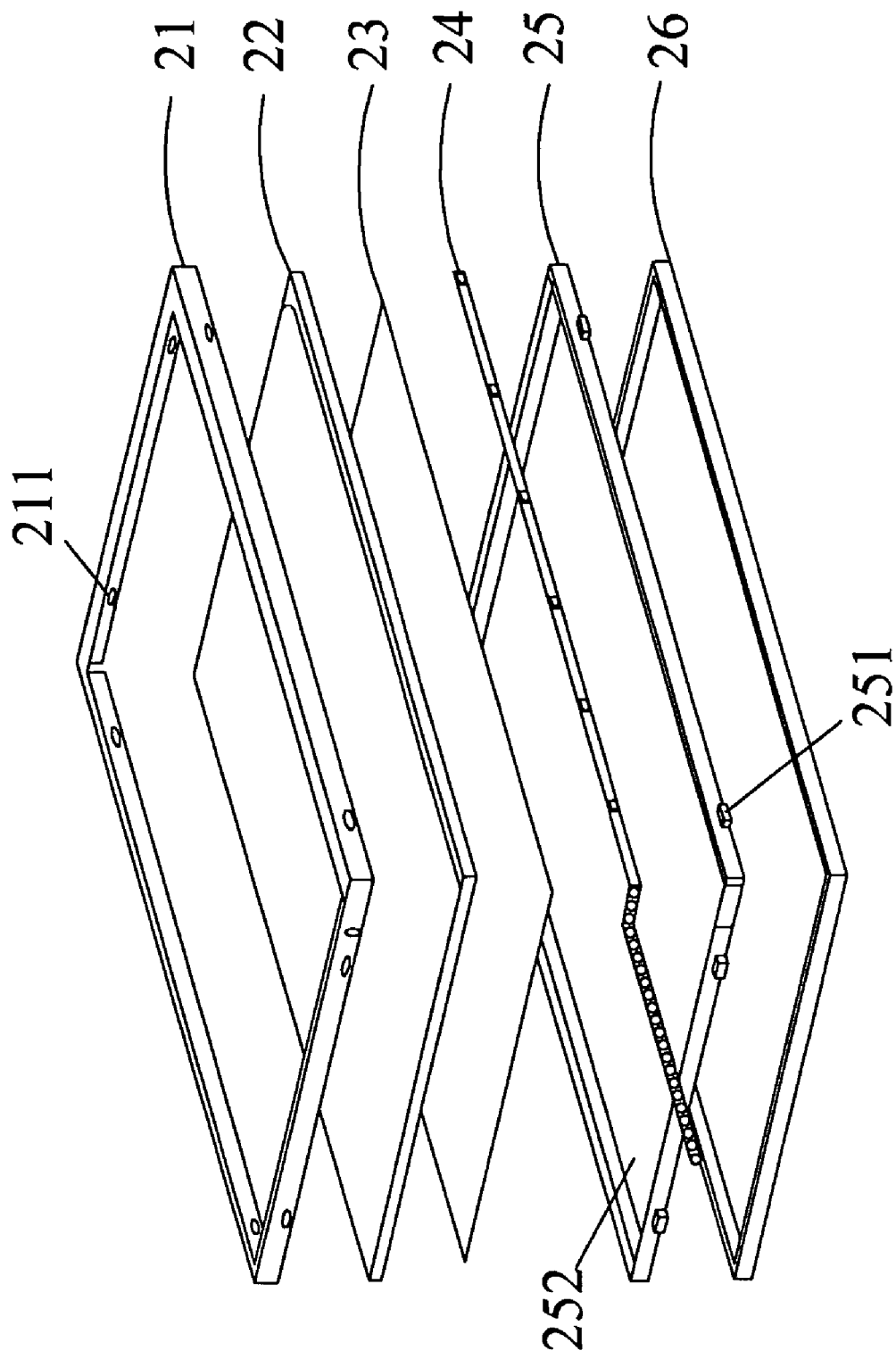
FIG. 2A is an exploded view of a display device with composite backlight module in accordance with a preferred embodiment of the present invention.
Figure 2B:
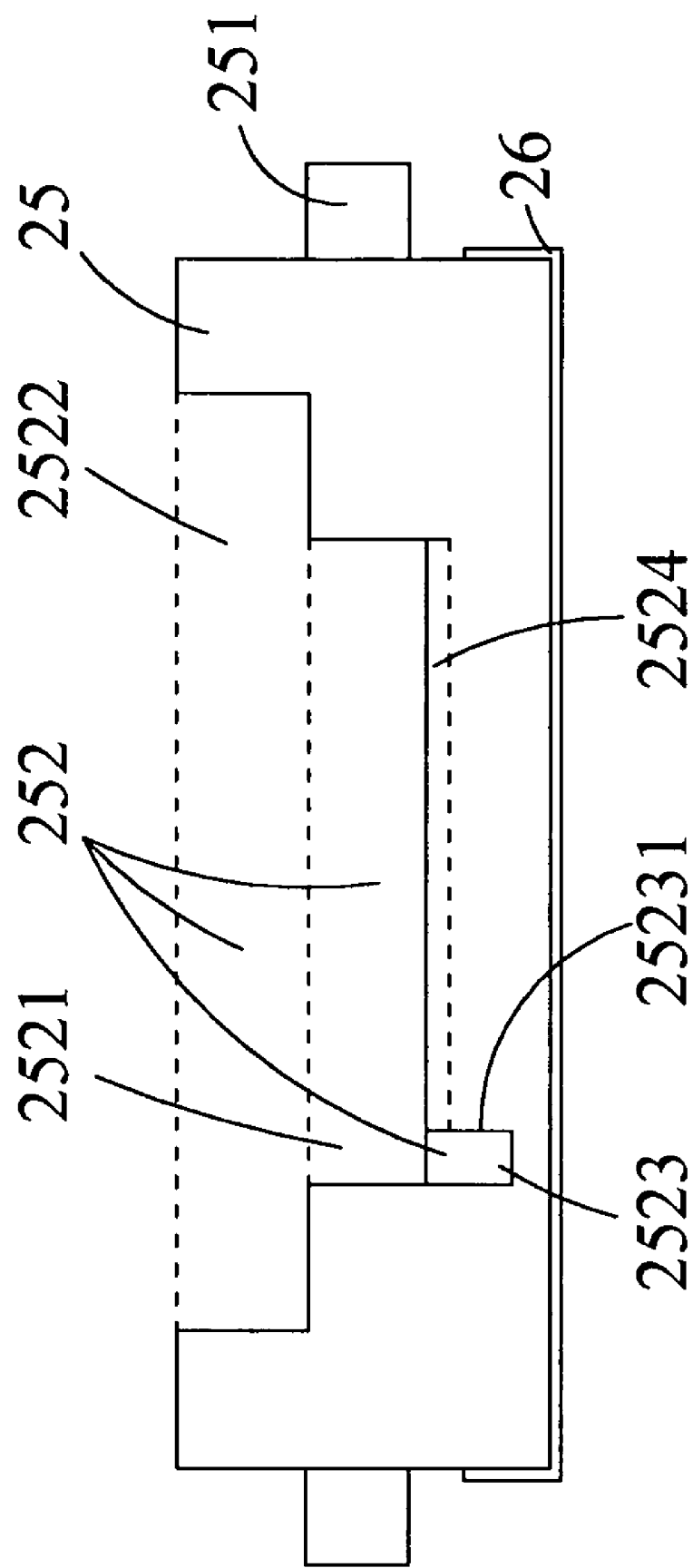
FIG. 2B is a cross-sectional view of a composite backlight module of a display device in accordance with a preferred embodiment of the present invention.

With reference to FIG. 2A for an exploded view of a display device with composite backlight module in accordance with a preferred embodiment of the present invention, the display device comprises a bezel 21, a cell 22 diposed under the bezel 21, at least one film 23 disposed under the cell 22, a light bar 24 and a composite backlight module 25. The bezel 21 includes a plurality of first connecting structures 211, and the light bar 24 is provided for supplying a light source to the cell 22, and the light bar 24 includes at least one light emitting diode and a printed circuit board, wherein the light bar 24 can be a cold cathode fluorescent lamp. The composite backlight module 25 includes a plurality of second connecting structures 251 and a containing space 252. With reference to FIG. 2B, the containing space 252 includes a first recessed portion 2521, a second recessed portion 2522 and a third recessed portion 2523 for containing the film 23, the cell 22 and the light bar 24 respectively. In addition, the open region area of the second recessed portion 2522 is greater than an open region area of the first recessed portion 2521; the open region area of first recessed portion 2521 is greater than an open region area of the third recessed portion 2523. In addition, the third recessed portion 2523 is disposed at the bottom of the first recessed portion 2521 for placing the light bar 24, and the third recessed portion 2523 is disposed on a lateral side of the containing space 252 and in a slender shape. The dimension of the first recessed portion 2521 is corresponding to the dimension of the film 23 for accommodating the film 23 and fixing the film 23 to its position, and the dimension of the second recessed portion 2522 is corresponding to the dimension of the cell 22 for accommodating the cell 22 and fixing the cell 22 to its position. With this design, the cell 22 and the film 23 will not be moved or damaged by collisions or impacts easily. The composite backlight module 25 includes a light guide portion 2524 for guiding the light transmitted from light bar 24 towards a light exit surface of the composite backlight module 25, wherein the light exit surface is arranged corresponding to a surface of the cell 22, disposed at the bottom of the first recessed portion 2521, and integrally formed with the composite backlight module 25, and then the film 23 uniformizes the light and supplies a uniformly distributed light source to the cell 22. With reference to FIG. 2B, a lateral surface of the third recessed portion 2523 is a light incident surface 25231 of the light guide portion 2524. The composite backlight module 25 is made of a transparent material such as acrylic resin by injection molding. The film 23 includes a diffuser sheet and at least one prism sheet. Furthermore, the film 23 is disposed under the cell, and the light guide portion 2524 is disposed under the film 23, and the light bar 24 is installed on a lateral side of the composite backlight module 25, so that light emitted from the light bar 24 is passed through the light guide portion 2524 and the film 23 to form a uniform light and projected to the cell 22. The second connecting structure 251 is engaged with the first connecting structure 211 for securely covering the bezel 21 onto the composite backlight module 25 to protect the internal structure of the display device. With reference to FIG. 2A, the display device further comprises a reflector 26, and its structure includes a bottom and at least one lateral side as shown in FIG. 2A, and the reflector 26 can be a box structure. The reflector 26 is disposed at the bottom and the periphery of the composite backlight module 25 for reflecting the emitted light towards the bottom of the composite backlight module 25 to avoid light emitted by the light bar 24 from projecting from the bottom of the composite backlight module 25, so as to improve the utility rate of the light and enhance the luminance of the cell 22. The reflector 26 can be attached onto the bottom of the composite backlight module 25 by a double-sided adhesive or any coupling method. Although the reflector 26 of the preferred embodiment is a box structure, the invention is not limited to such arrangement only. In another preferred embodiment, the reflector 26 can be designed as a sheet structure without a lateral side of a box structure.

The present invention integrates the light guide plate (LGP), the backcover and the frame as a whole to form the composite backlight module 25. The composite backlight module 25 is made of a same material by injection molding (which can produce modules in various different shapes), and effectively integrates three components, such as the light guide plate (LGP), the backcover and the frame into a component. The composite backlight module 25 still maintains the functions and strength of the original three components and effectively simplifies the three components to a component module, and thus the composite backlight module 25 simply goes through the injection molding process once. In addition, the present invention uses the same material to produce the composite backlight module 25, and thus not only reducing the components and materials, but also simplifying the manufacturing procedure and lowering the cost.

Figure 2C:
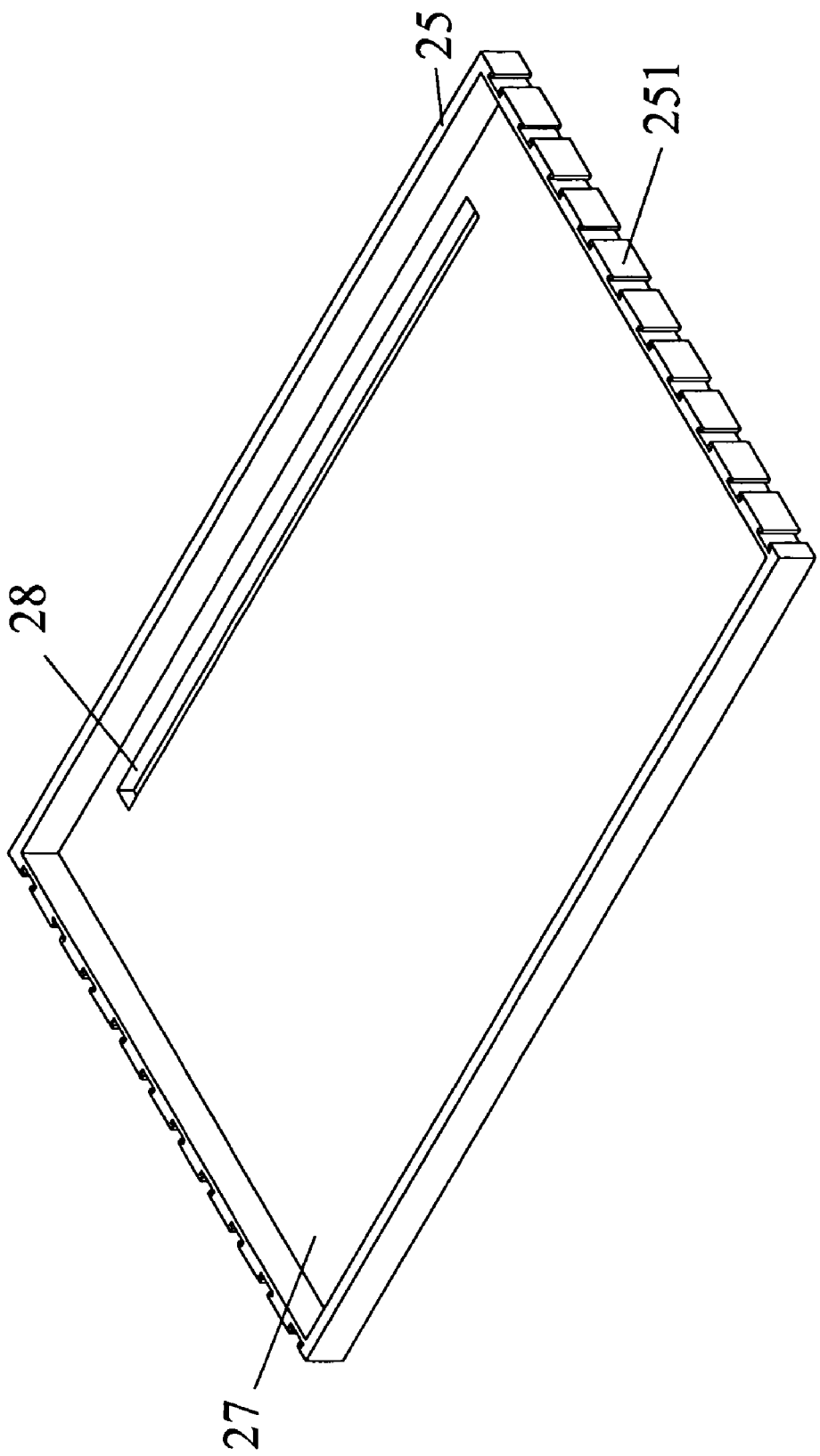
FIG. 2C is a schematic view of a display device with composite backlight module in accordance with another preferred embodiment of the present invention.

With reference to FIG. 2C for a schematic view of a display device with composite backlight module in accordance with another preferred embodiment of the present invention, the composite backlight module 25 comprises a first recessed portion 27 and a second recessed portion 28, wherein the first recessed portion 27 is provided for placing the cell 22 and the film 23, and the second recessed portion 28 is provided for placing the light bar 24 and in a slender shape (as shown in the figure), and the open region area of the first recessed portion 27 is greater than an open region area of the second recessed portion 28. The composite backlight module 25 includes a light guide portion 2524, wherein a light incident surface of the light guide portion 2524 is also a lateral surface of the second recessed portion 28, and the main light exit surface of the light guide portion 2524 is also the bottom side of the first recessed portion 27. In other words, the light exit surface of the light guide portion 2524 is arranged corresponding to a surface of the cell 22. The composite backlight module 25 is made of a transparent material such as acrylic resin by injection molding. Therefore, light emitted by the light bar 24 can be passed from a lateral side (which is also the light incident surface of the light guide portion 2524) of the second recessed portion 28 and entered into the light guide portion 2524 of the composite backlight module 25, and finally guided to the outside from the bottom side (which is also the light exit surface of the light guide portion 2524) of the first recessed portion 27. The film 23 uniformizes the light to supply a uniformly distributed light source to the cell 22. The composite backlight module 25 has a plurality of second connecting structures 251 engaged with the first connecting structure 211 of the bezel. The composite backlight module 25 effectively integrates the light guide plate (LGP), the backcover and the frame into a component to form the composite backlight module 25. The composite backlight module 25 still maintains the original functions and strength of the three components and effectively simplifies three components into a component module, and thus the manufacturing procedure of the composite backlight module 25 can be simplified. The present invention uses the same material to produce the composite backlight module by the injection molding process, and such arrangement not only reduces the components and materials, but also simplifies the manufacturing procedure and lowers the manufacturing cost.

What is claimed is:

1. A display device with composite backlight module, comprising:

a bezel having a first connecting structure;

a cell disposed under the bezel;

a film disposed under the cell;

a light bar; and one composite backlight module having a containing space and a second connecting structure and a light guide portion integrally formed thereon;

wherein the cell, the film and the light bar are situated at the containing space, and the second connecting structure is installed on an outer lateral side of the composite backlight module for engaging with the first connecting structure, and the composite backlight module and the second connecting structure are made of the same material, wherein the composite backlight module and the second connection structure are integrally formed by injection molding, wherein the containing space includes a first recessed portion, a second recessed portion and a third recessed portion, and an open region area of the second recessed portion is greater than an open region area of the first recessed portion, and the open region area of the first recessed portion is greater than an open region area of the third recessed portion, wherein the first recessed portion has a dimension corresponding to the dimension of the film for placing and securing the film, the second recessed portion has a dimension corresponding to a dimension of the cell for placing and securing the cell and the third recessed portion is in a slender shape for accommodating the light bar.

2. The display device with composite backlight module of claim 1, further comprising a reflector disposed at the bottom and the periphery of the composite backlight module for reflecting light emitted toward the bottom of composite backlight module.

3. The display device with composite backlight module of claim 2, wherein the reflector has a bottom and at least one lateral side.

4. The display device with composite backlight module of claim 3, wherein the reflector is a box structure.

5. The display device with composite backlight module of claim 1, wherein the open region area of the first recessed portion is greater than an open region area of the third recessed portion.

6. The display device with composite backlight module of claim 1, wherein the film is at least one diffuser sheet or at least one prism sheet.

7. The display device with composite backlight module of claim 1, wherein the composite backlight module is made of a transparent material by injection molding.

8. The display device with composite backlight module of claim 1, wherein the bezel covers the composite backlight module for securing the structure of the display device.

* * * * *